United States Patent

Repp et al.

[11] Patent Number: 5,858,141
[45] Date of Patent: Jan. 12, 1999

[54] METHOD AND APPARATUS TO ATTACH FOIL SEALS TO NECKS

[75] Inventors: Richard E. Repp, San Jose; Daniel Luch; Anna Absolom, both of Morgan Hill, all of Calif.

[73] Assignee: Portola Packaging, Inc., San Jose, Calif.

[21] Appl. No.: 721,852

[22] Filed: Sep. 30, 1996

Related U.S. Application Data

[63] Continuation-in-part of Ser. No. 664,101, Jun. 11, 1996, Pat. No. 5,664,694, which is a continuation of Ser. No. 274,911, Jul. 14, 1994, abandoned, which is a continuation-in-part of Ser. No. 951,653, Sep. 25, 1992, Pat. No. 5,415,306, which is a continuation-in-part of Ser. No. 830,133, Jan. 31, 1992, Pat. No. 5,267,661, which is a continuation-in-part of Ser. No. 772,945, Oct. 8, 1991, Pat. No. 5,213,224, which is a continuation-in-part of Ser. No. 565,638, Aug. 9, 1990, Pat. No. 5,190,178.

[51] Int. Cl.⁶ .............................. B65B 7/28; B67B 3/20
[52] U.S. Cl. .............................. 156/69; 53/478; 53/485; 53/490
[58] Field of Search ............................ 156/69, 272.4; 215/232; 53/478, 485, 490

[56] References Cited

U.S. PATENT DOCUMENTS

| | | | |
|---|---|---|---|
| 3,767,076 | 10/1973 | Kennedy | 156/69 |
| 3,909,326 | 9/1975 | Renck | 156/69 |
| 3,928,109 | 12/1975 | Pollock | 156/69 |
| 4,017,704 | 4/1977 | Collins . | |
| 4,237,360 | 12/1980 | Pohlenz | 156/69 |
| 4,484,687 | 11/1984 | Bullock, III . | |
| 4,531,649 | 7/1985 | Shull . | |
| 4,605,136 | 8/1986 | Debetencourt . | |
| 4,625,875 | 12/1986 | Carr et al. . | |
| 4,722,447 | 2/1988 | Crisci . | |
| 4,739,891 | 4/1988 | Bullock, III . | |
| 4,754,890 | 7/1988 | Ullman et al. . | |
| 4,815,617 | 3/1989 | Cullum . | |
| 4,863,061 | 9/1989 | Moore | 215/232 |
| 4,872,571 | 10/1989 | Crecelius et al. . | |
| 4,893,718 | 1/1990 | Delespaul et al. . | |
| 4,917,949 | 4/1990 | Yousif | 156/69 |
| 4,981,229 | 1/1991 | Lanham . | |
| 5,004,111 | 4/1991 | McCarthy | 215/232 |
| 5,121,845 | 6/1992 | Blanchard . | |
| 5,197,621 | 3/1993 | Bartl et al. . | |

*Primary Examiner*—Daniel Stemmer
*Attorney, Agent, or Firm*—Flehr Hohbach Test Albritton & Herbert LLP

[57] ABSTRACT

A method and apparatus for sealing a container with a cap and a seal member which is adhered to the neck. The seal member is inserted into the cap before the cap is applied to the neck by moving the cap in an axially downward direction relative to the neck to substantially seat the cap on the neck so that the cap cannot be removed without unscrewing the cap. The seal member is firmly held against the neck by the cap while the seal disc is adhered to the neck. In one modification, a pressure application applies a downward directed force to urge the cap against the neck while the seal disc is adhered to the neck. In another modification, the cap is tightened onto the neck at a fine adjustment station to eliminate gaps between the underside of the cap and the neck before the seal disc is adhered to the neck.

21 Claims, 5 Drawing Sheets

METHOD AND APPARATUS TO ATTACH FOIL SEALS TO NECKS

CROSS-REFERENCE TO RELATED APPLICATIONS

This application is a continuation-in-part of application Ser. No. 08/664,101, filed Jun. 11, 1996, now U.S. Pat. No. 5,664,694, which is a continuation of application Ser. No. 08/274,911, filed Jul. 14, 1994, now abandoned, which is a continuation-in-part of application Ser. No. 07/951,653, filed Sep. 25, 1992, now U.S. Pat. No. 5,415,306, which is a continuation in part of application Ser. No. 07/830,133, filed Jan. 31, 1992, now U.S. Pat. No. 5,267,661, which is a continuation-in-part of application Ser. No. 07/772,945, filed Oct. 8, 1991, now U.S. Pat. No. 5,213,224, which is a continuation-in-part of application Ser. No. 07/565,638, filed Aug. 9, 1990, now U.S. Pat. No. 5,190,178. The disclosures of the abovementioned applications are hereby incorporated herein by reference.

BACKGROUND OF THE INVENTION

1. Field of the Invention

The present invention relates in general to a system for applying closures to containers and, more particularly, to a method and apparatus for sealing a container by applying a closure and a seal membrane to the container neck.

2. Description of the Related Art

Many closure systems include a cap and a foil liner sealing the neck opening to preserve the freshness of the product and provide visual evidence that the container has not been previously opened. The underside of the foil seals are usually provided with a substance such as an adhesive or a polymer coating which adheres the liner to the container neck when the substance is activated by induction heating or other means. Preferably, the foil disc is adhered to the entire circumference of the neck so that the container is completely sealed by the liner.

The foil seal disc may be applied to the neck before the closure, with the foil disc being pressed against the lip by an applicator during activation of the adhesive or other suitable substance. By evenly pressing the seal against the lip during application, an effective seal may be obtained around the entire circumference of the neck. After the neck is sealed with the foil disc, the closure is applied in a separate step as is known in the art. Although applying the seal and cap in separate steps may be used to obtain an effective seal between the foil disc and the neck, this method is time consuming and inconvenient.

Positioning the foil disc in the closure prior to application allows the disc and the closure to be simultaneously applied to the container neck. The closure is seated on the neck using known capping techniques. When the closure is fully seated on the neck, the top of the closure holds the foil disc against the lip of the container neck. The adhesive or other substance is activated to adhere the disc to the neck. The effectiveness of the seal between the foil disc and the lip around the neck circumference depends in part on whether the foil disc is uniformly held against the neck by the cap when the seal is attached to the neck. If the cap is orientated at an angle relative to the neck, the closure may not apply sufficient pressure to obtain an effective seal around the circumference of the foil disc. For threaded closure systems, the final position or height of the cap may vary depending upon the initial orientation of the cap threads relative to the neck threads. At the upper end of this height range, where the cap is not fully tightened onto the container neck, a gap may be introduced between the underside of the cap top and the lip. This gap may prevent the cap from applying sufficient force to press the foil seal against the neck. As a result, the foil seal may be only partially adhered to the neck or, in some instances, the foil disc may not be attached at all to the foil disc.

This invention provides a system for sealing a container with a foil disc and the like. The closure and foil disc are simultaneously positioned on the container neck, improving the efficiency of the capping process. With the method and apparatus of this invention, the liner disc is securely held against the lip of the container neck during activation of the adhesive or other suitable substance to promote the formation of an effective seal. The present invention offers considerable advantages over prior structures as is evident from the description of the related art and the following description of the invention.

SUMMARY OF INVENTION

In summary, the present invention provides a method and apparatus for sealing a container using a closure system which includes a cap which is seated on the neck and a seal disc, such as a foil seal, which is adhered to the lip of the neck. With the method of this invention, the seal disc is inserted into the cap before application of the cap to the neck. The cap, with the seal disc retained therein, is positioned on the container neck. Pressure is applied to the cap, the neck or both the cap and neck to move the cap onto the neck to substantially bring the cap skirt and neck skirt into engagement.

In one modification of the invention, the seal disc is heated as the cap is pushed onto the neck. The pressure applicator presses the cap and the heated seal disc against the lip of the neck, temporarily eliminating gaps between the cap, seal disc and neck, so that the seal disc may become adhered to the container neck. The seal disc may be heated using inductive heating or other suitable means. The apparatus of this invention includes a pressure applying device for applying pressure to the cap and/or the container to seat the cap onto the neck and press the seal disc against the lip of the neck while the seal disc is heated. The apparatus also includes a heating device positioned to heat the seal disc to cause the seal disc to become at least partially adhered to the neck. The container is moved relative to the pressure applying device by a support.

In another modification of the invention, pressure is applied to axially move the cap onto the neck as previously described. At this stage of application, the final height of the cap on the neck varies depending upon the relative position of the thread leads on the cap and neck. The cap is tightened onto the neck by slightly twisting the cap relative to the neck. In a preferred modification, one or more rotating wheels engage the sides of the cap to turn the cap relative to the neck. Heat is applied to the closed container using an induction heater or other suitable heat source to cause the seal disc to become adhered to the container neck.

The cap application system of this invention may be used to obtain an effective seal between the seal disc and the lip of the neck when the seal disc is inserted into the cap before the cap is applied to the neck. Applying the cap and seal disc simultaneously significantly simplifies the application process. The seal disc is held against the lip, by the pressure applicator or the cap, during heating so that the seal disc may be securely adhered to the container neck.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
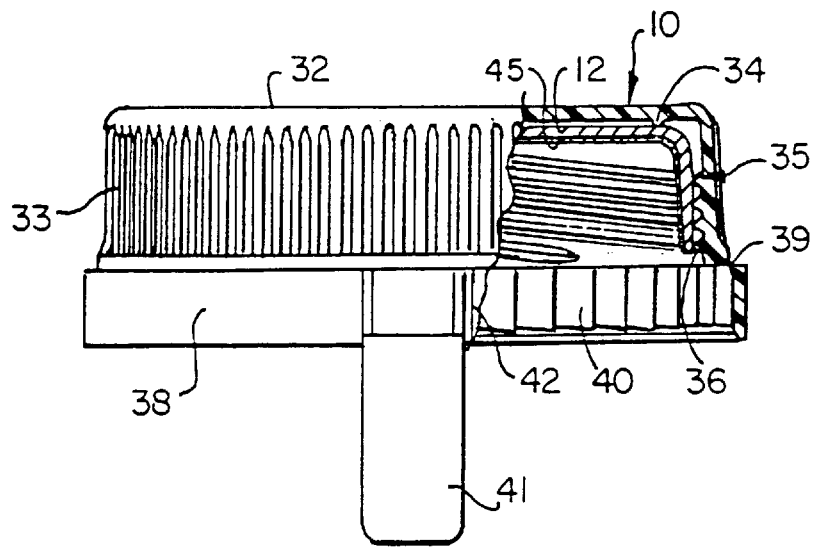
FIG. 1 is a side elevational view, partially broken away, of a cap and seal disc.
Figure 2:
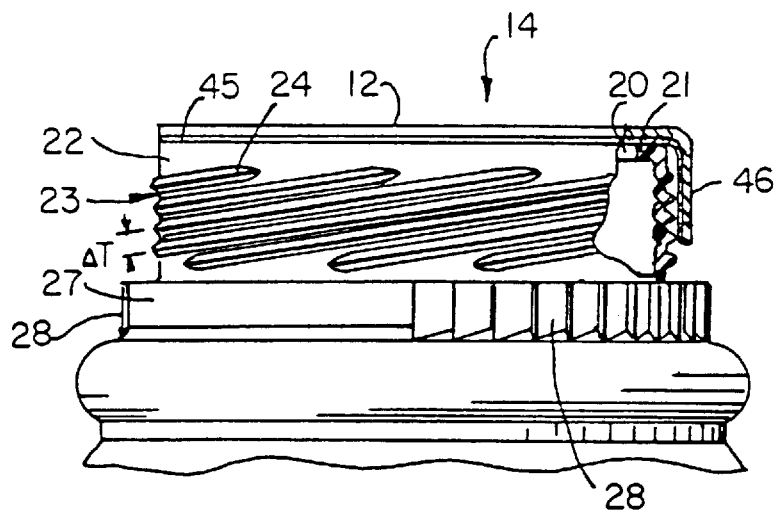
FIG. 2 is a side elevational view, partially broken away, of a neck with a seal disc adhered to the lip.

FIGS. 1 and 2 shows an example of a cap 10 and a seal disc 12, hereinafter described in more detail, which may be used with a container neck 14. The neck 14 generally includes an opening 20 and a lip 21 surrounding the opening 20. With this modification, the lip 21 is provided by an inwardly-directed lip flange although the lip may also have other configurations such as an annular rim. A neck stretch 22 depending from the lip 21 has exterior engagement means, for example a helical thread configuration 23. The helical thread configuration 23 cooperates with engagement means on the cap 10 to retain the cap on the neck 14. The neck shown in FIG. 1 has a multi-lead thread configuration 23 which includes seven threads or leads 24. In the illustrated embodiment, each thread 24 extends about 180° around the circumference of the neck, although it is to be understood that threads of lesser or greater extent, for example within the range of 90° to more than 360°, may also be employed if desired. Preferably, the neck has a fine thread density to limit the vertical float of the cap on the neck, discussed in more detail below. The thread density is typically within the range of 12 to 20 threads per linear inch, for example 17 to 18 threads per linear each. The neck stretch 22 terminates in a locking wall portion 27 which is formed with a plurality of ratchet teeth 28. Preferably, the teeth are arranged in two groups of 8 to 15 teeth each although the number and position of the teeth 28 is subject to considerable variation.

Cap 10 generally includes a top 32 and an upper skirt 33 depending from the top 32. The top 32 may be substantially flat as shown, or the top may have other shapes as for example a dome configuration. An annular rib 34 depends from the underside of the top 32 and engages the seal disc 12 to urge the disc against the neck 14. The interior of the skirt 33 is formed with engagement means, such as a helical thread configuration 35. The cap 10 shown in FIG. 1 has a multi-lead thread configuration 35 having seven threads or leads 36 and a thread density of about 17 to 18 threads per inch. Each thread 36 extends about 150° to 190° around the circumference of the upper skirt 33. However, it is to be understood that the thread length may be increased or decreased if desired, for example in the range of 90° to more than 360°, and the thread density may be in the range of 12 to 20 threads per linear inch. Preferably, the thread configuration 23 on the neck and the thread configuration 35 on the cap each have at least two leads and a thread density of at least 12 thread per inch.

The thread configuration 23 on the neck and the thread configuration 35 on the cap are shaped to slip past one another and engage when a direct, axial downward force is applied to axially move the cap onto the neck. In other words, when the cap is pushed onto the neck, the threads on the closure 10 snap over and engage the threads on the neck 14. In the illustrated modification, the thread configurations 23 and 35 each have multiple turns of thread, with a vertical line drawn through each thread configuration intersecting four or five turns of thread depending upon the location of the line around the circumference of the neck stretch and upper skirt, respectively. This ensures there will be multiple turns of thread engagement when the cap is applied to the neck. The total thread engagement is subject to variation and, depending upon the linear thread density, there may be as little as one turn of thread engagement or more than five turns of engagement.

As shown in FIG. 1, the cap 10 and neck 14 include tamper-evidencing means to alert the consumer to possible tampering with the contents of the container. A removable, lower skirt 38 is frangibly attached to the upper skirt 33 by a frangible means such as bridges 39. Instead of bridges, a circumferentially extending line of weakness or tear line, or a combination of bridges and one or more weakened lines, may be used to frangibly join the lower skirt to the upper skirt. The interior of the lower skirt 38 includes a plurality of ratchet teeth 40 shaped to engage the teeth 28 on the locking wall stretch of the cap. As shown in FIG. 1, the teeth 40 are joined directly to the upper skirt 33, providing the frangible bridges 39. Other configurations may also be used; for example, the lower skirt portion may include an inwardly extending shoulder which is joined to the lower skirt by the frangible bridges. The engaged teeth 28 and 40 prevent the cap from being unscrewed from the neck so long as the lower skirt 38 is attached to the upper skirt 33. The teeth 40 slip between and into engagement with the teeth 28 when the cap 10 is moved axially downward onto the neck 14. In the illustrated modification, the teeth 40 have beveled tips which may be used as a "fine" adjustment system as the cap is initially applied to direct the teeth 40 into the spaces between adjacent teeth 28 on the neck. If desired, the teeth 28 on the neck may also be shaped to guide the teeth 40 into the spaces between teeth 28. The teeth 28 and 40 on the locking wall portion 27 and lower skirt portion 33, respectively, are positioned close together. Although not shown, the teeth may also be spaced further apart, increasing the space between adjacent teeth.

When the cap 10 is initially removed from the container neck 14, the lower skirt 38 must be at least partially separated from the upper skirt 33. This may be accomplished by twisting the closure and breaking the frangible connection between the upper and lower skirts. Alternatively, the lower skirt 38 may be removed before the cap is unscrewed by gripping a pull tab 41 and pulling the lower skirt away from the upper skirt 33. A vertically extending line of weakness 42 adjacent the pull tab 41 splits the skirt 38 to facilitate removal of the lower skirt portion. In this modification, the tab 41 depends from the lower edge of the skirt 38. However, the tab 41 may also have other shapes.

Seal disc 12 seals the opening 20 of the neck 14, providing a secondary tamper-evidencing feature and preserving the freshness of the product stored in the container. In the illustrated embodiment, seal disc 12 is a foil sealing disc or liner of a commercially available type. The disc 12 generally includes an adhesive layer 45 for adhering the disc 12 to the lip 21 of the neck and a tab 46 for removal of the disc from the container. The adhesive layer 45 is provided by suitable means such as a heat sensitive compound which bonds with the lip 21 upon application of heat, as by induction means or another known method. The seal disc 12 is inserted into the cap 10 before it is applied to the neck, with the thread configuration 35 loosely retaining the disc 12 against the underside of the top 32. Once the cap 10 is applied to the neck 14, the adhesive layer is activated to adhere the seal disc to the lip of the container.

Figure 3A:
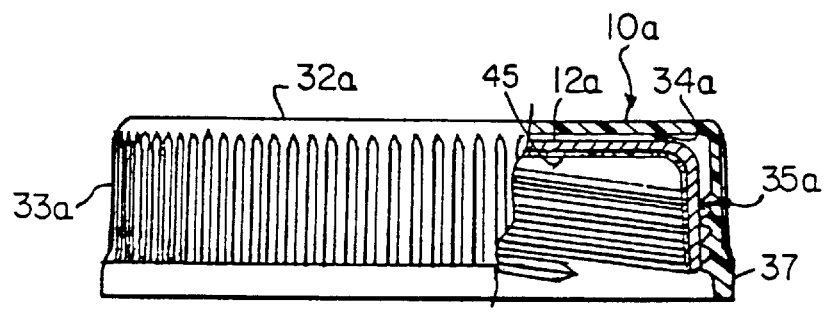
FIGS. 3A and 3B are side elevational views, partially broken away, of a modified cap and neck with a seal disc.
Figure 3B:
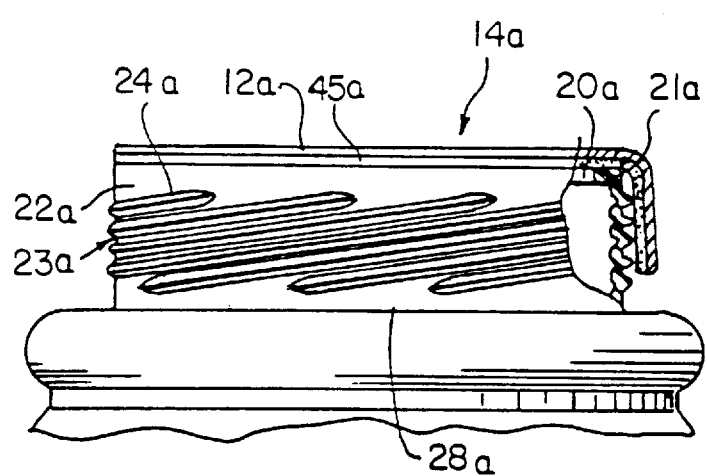

FIGS. 3A and 3B illustrate another example of cap and neck. As is shown in FIG. 3A, the cap 10a includes an upper skirt 33a depending from the top 32a and formed with an interior helical thread configuration 35a. The skirt 33a has a lower edge 37. The neck 14a shown in FIG. 3B includes a neck stretch 22a depending from the lip 21a and formed with an exterior thread configuration 23a. Unlike the cap 10 and neck 14 shown in FIGS. 1 and 2, the modified cap 10a and neck 14a do not include tamper-evidencing means. Instead, with this modification the presence of an intact seal disc 12a seals the container, protecting the contents from spoilage and providing the consumer with the visual assurance that the container has not been previously opened. Elements of the cap 10a and neck 14a of FIGS. 3A and 3B which are similar to those shown in the previously described cap and neck are designated by the reference numeral and "a".

After the axial, downward movement of the cap 10 onto the neck 14 is completed, the final height of the cap varies depending upon the relative positions of the thread configurations 23 and 35 at the point of initial engagement. The cap 10 generally may be pushed onto the neck until the lowermost portion of the threads on the cap seat under the lowermost portion of the threads on the neck or the lip 21 presses the seal disc against the underside of the top 32. The height of the cap on the neck when this condition is reached depends upon the orientation of the thread configuration 35 relative to the thread configuration 23. In one final position, the underside of the top 32 of the cap urges the disc 12 against the lip 21 of the neck. The other end of the range is vertical float of the cap on the neck is where the cap in its final position is vertically spaced above the fully seated position by a distance "y" equal to the vertical spacing $\Delta T$ (FIG. 2) between adjacent turns of thread. Depending upon the relative position of the thread leads at initial engagement, the height of the cap will vary within the range of y=0, the fully seated position, to y=$\Delta T$. In the illustrated modification, where the thread density is about 17–18 threads per linear inch, $\Delta T$ is approximately 0.06 inch (1.5 mm). As stated above, the vertical float of the cap may be reduced by increasing the density of the threads such that a cap and neck with a thread density of 20 threads per linear inch will have a maximum cap height of 0.5 inch (1.3 mm) and a cap and neck with a thread density of 12 threads per inch will have a maximum cap height of 0.08 inch (2.1 mm).

Unless the cap 10 is in the fully-seated position, where y=0, a gap may be introduced between the seal disc 12 and the underside of the top 32. This gap may prevent the cap from pressing the disc 12 against the lip 21 during activation of the adhesive layer 45. As a result, in some instances the seal disc 12 may not be effectively sealed to the lip 21 of the container neck.

Figure 4:
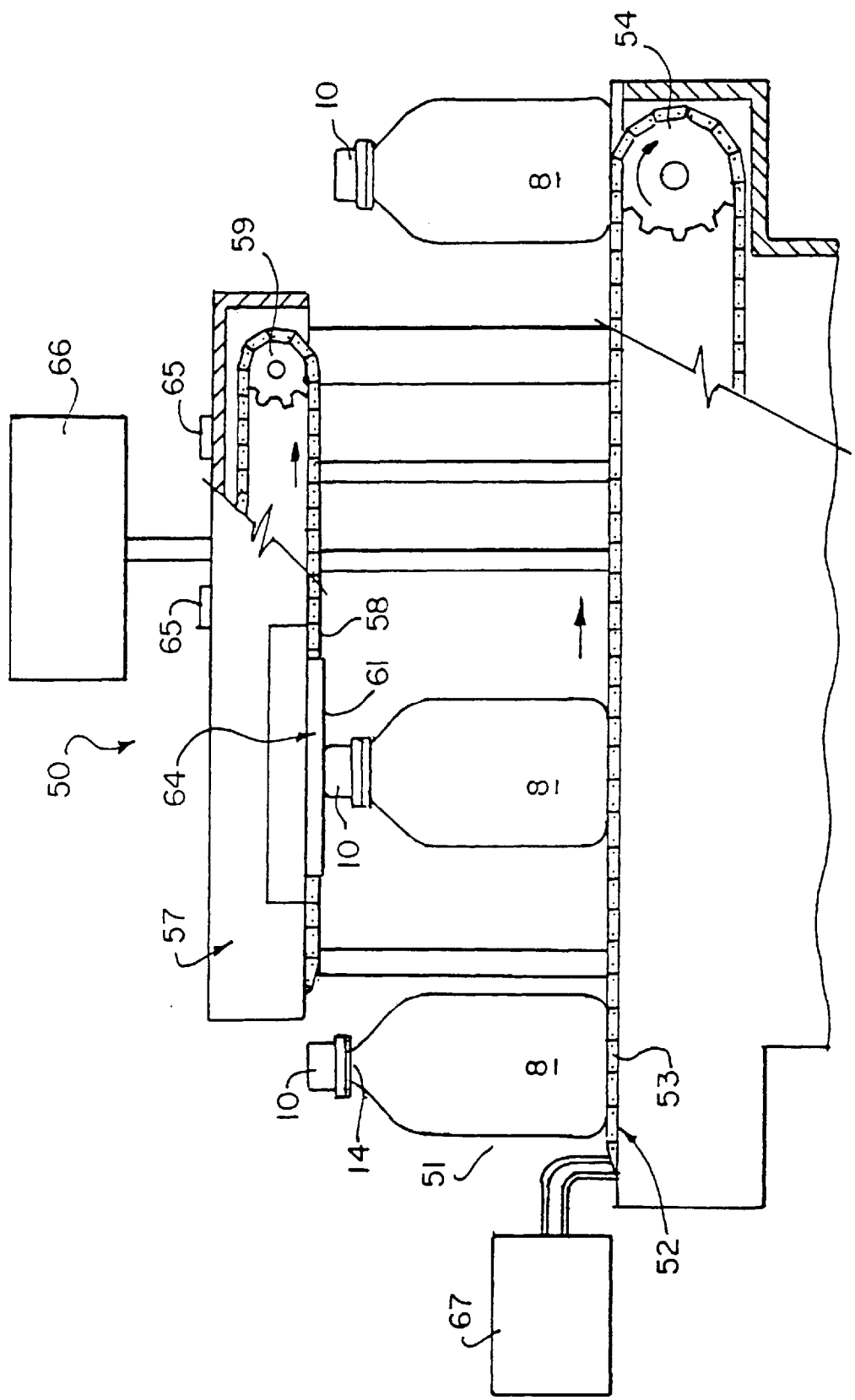
FIG. 4 is a schematic, side elevational view of the application system of this invention.
Figure 5:
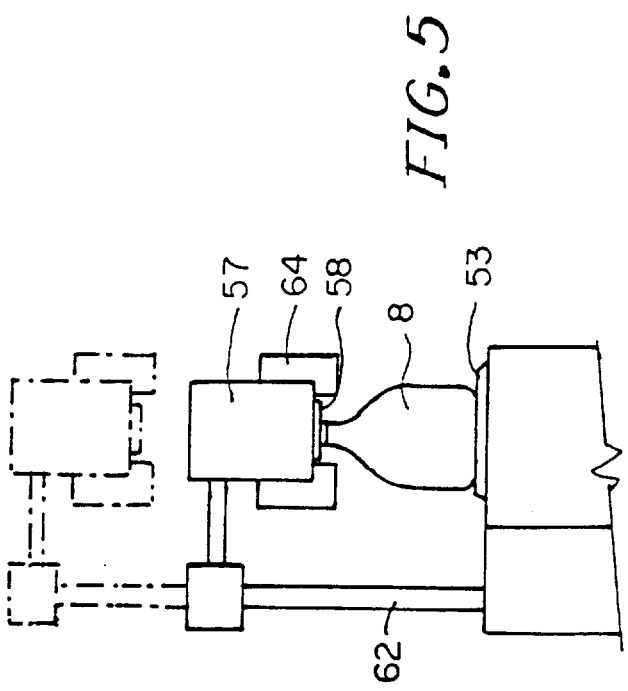
FIG. 5 is an end view of the application system of FIG. 4.

The closure application system of this invention ensures that the cap 10 always urges the seal disc 12 against the neck to form an effective seal between the adhesive layer 45 and the lip 21 of the container. FIGS. 4 and 5 schematically illustrate a closure application machine 50 for seating the cap 10 on the neck 14 and adhering the seal disc 12 to the lip 21. The application machine 50 generally includes an entrance station 51 which receives a container 8. Before the container 8 reaches the entrance station 51, a cap 10 is loosely positioned on the neck 14 using a suitable capping machine, not shown. With one capping machine well understood in the bottling art, the caps 10 are individually fed from a bowl along a conveyor which transports the cap to a discharge position. A container is moved beneath the cap, with the lip catching the cap and dislodging the cap from the discharge station onto the neck 14. At this time, there may be a limited amount of thread engagement; however, the cap 10 has not yet been seated on the neck.

At the entrance station 51, the container 8 is positioned on a support or conveyor 52 which transports the container 8 through the machine 50. In the illustrated modification, the conveyor 52 is provided by a conveyor belt 53 which is moved in an endless loop around a pair of spaced wheels 54 which are shaped to engage the underside of the belt. One or both wheels 54 are driven by a suitable motor (not shown) to propel the conveyor belt in the direction shown by the arrow. Instead of a conveyor belt 53, the conveyor 52 may be provided by other suitable means, such as a plurality of driven rollers.

The conveyor 52 moves the container 8 to a pressure applicator 57 which engages the cap 10 and forces the cap in a direct, axially downward direction to seat the cap on the neck 14. In the embodiment of the invention shown in FIGS. 3 and 4, the pressure applicator 57 includes a pressure belt 58 which is moved in an endless loop around a pair of spaced wheels 59, one or both of which is driven by a suitable motor (not shown). Preferably, the conveyor belt 53 and the pressure belt 58 are moved at substantially the same speed. The pressure belt 58 is directed in a curved path which slopes downwardly to a lowermost level at 61 where the cap 10 is pushed fully onto the neck 14, and then slopes upwardly as the belt 58 approaches the opposite end of the pressure applicator 57 to release the sealed container. As the conveyor 52 moves the container 8 relative to the pressure applicator, the belt 58 engages the cap 10 and forces the cap downwardly onto the neck to seat the cap on the container, with the thread configuration 35 on the upper skirt 33 snapping over and engaging the thread configuration 23 on the neck. As is shown in FIG. 5, the pressure applicator 57 is carried by a vertical support 62 which may be used to adjust the height of the pressure application to accommodate bottles of different sizes.

Closure application system 50 further includes a heater 64 which activates the adhesive layer 45 to adhere the seal disc 12 to the lip 21 of the container neck. In the illustrated embodiment, the heater 64 is provided by an inductive sealing assembly, although it is to be understood that other means may be used to activate the adhesive layer. Heater 64 is positioned to heat the adhesive layer as the cap 10 and container 8 move below the lowermost level of the pressure belt 53. At this position, the pressure applicator 57 forces the cap 10 and seal disc 12 against the neck 14 regardless of the final height of the cap on the neck. The cap 10 returns to its final position, which is determined by the relative orientation of the threads 24 and 36 when they are initially engaged, as the container 8 and cap 10 are released from the pressure applicator 57. The pressure applicator 57 thereby overcomes any gaps between the cap, seal disc and neck to ensure the seal disc is fully pressed against the neck to obtain an effective seal.

As the container approaches the lowermost level 61, the cap 10 is cocked at a slight angle with the pressure belt 58 pressing the forward side of the cap and seal disc against the container neck, causing this portion of the adhesive layer 46 to become adhered to the lip 21. As the container 8 passes beneath the lowermost level of the belt, successive portions of the cap and seal disc are pressed against the neck. The back end of the cap and seal disc are pressed against the neck as the container moves away from the lowermost portion. At this stage, less pressure is applied to the forward end of the cap. However, the adhesive layer is now bonded to the lip 21. Thus, in the illustrated embodiment, the pressure application essentially rocks or pivots the cap 10 relative to the neck. In other modifications of the invention, pivoting the cap relative to the neck may not be required.

As is shown schematically in FIG. 4, the closure application machine 50 also includes one or more fans 65 for cooling the heated seal disc 12 and closure 10. A control system, generally designated 66, controls operation of the machine 50 and a power supply 67 supplies the power for operating the machine, driving the belts 53 and 58, and operating the heater 64.

With this invention, heat is applied to activate the adhesive layer and bond the seal disc 12 to the neck while pressure is applied to urge the cap downwardly against the container neck. The seal disc 12 is thereby securely held against the lip 21 during the critical bonding stage—ensuring an effective seal is formed around the entire circumference of the neck. In the illustrated modification, pressure application 57 is used to seat the cap on the neck as well as press the cap and seal disc against the lip of the container neck during heating. However, it is to be understood that the cap 10 may be seated on the neck before it reaches the pressure applicator, with the pressure applicator urging the cap and seal disc against the neck while the adhesive layer 46 is activated to adhere the seal disc 12 to the lip 21. In this situation, the cap may be applied using a direct, axial downward force as in the previous embodiment, by twisting or by a combination of application methods.

Figure 6:
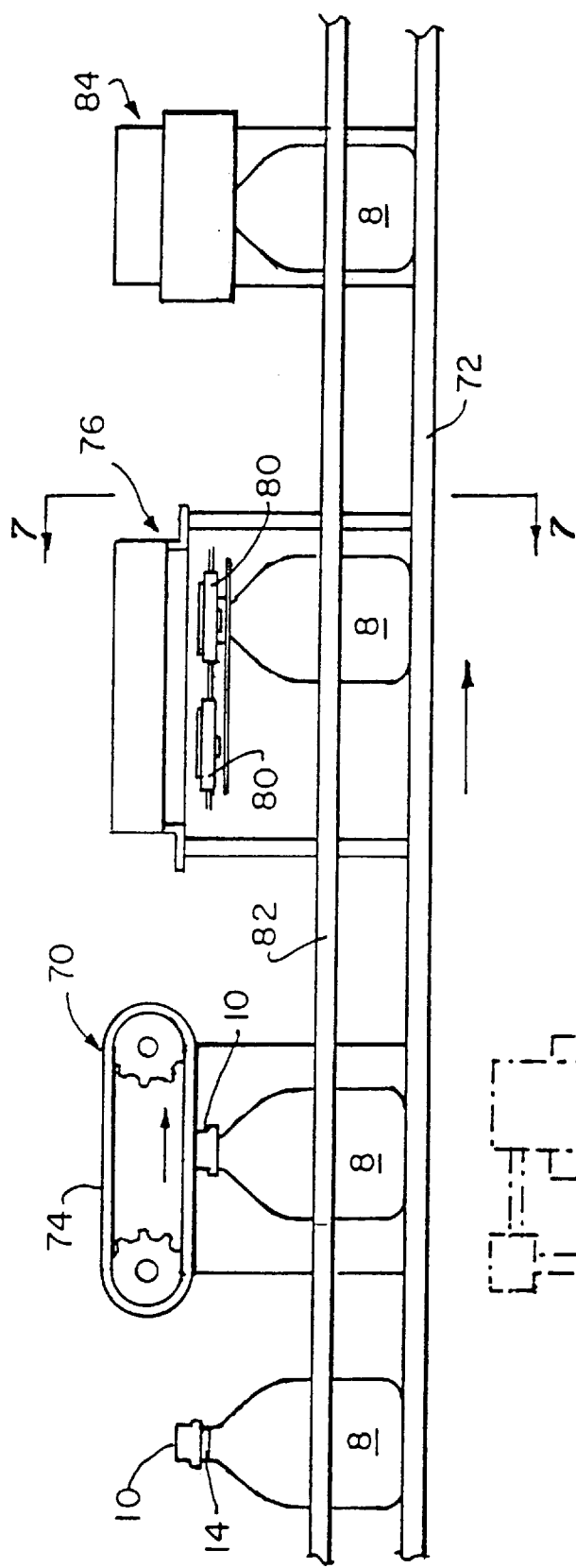
FIG. 6 is a schematic view of an application system in accordance with another embodiment of the invention.
Figure 7:
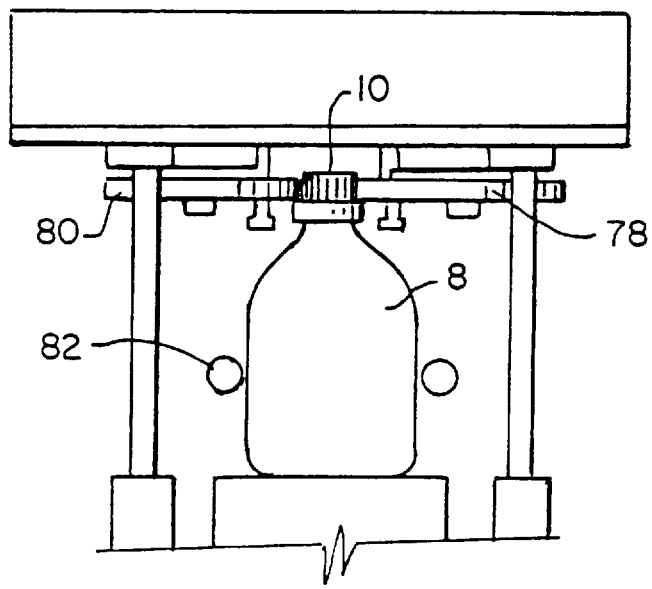
FIG. 7 is a schematic view taken substantially along the line 7—7 of FIG. 6.
Figure 8:
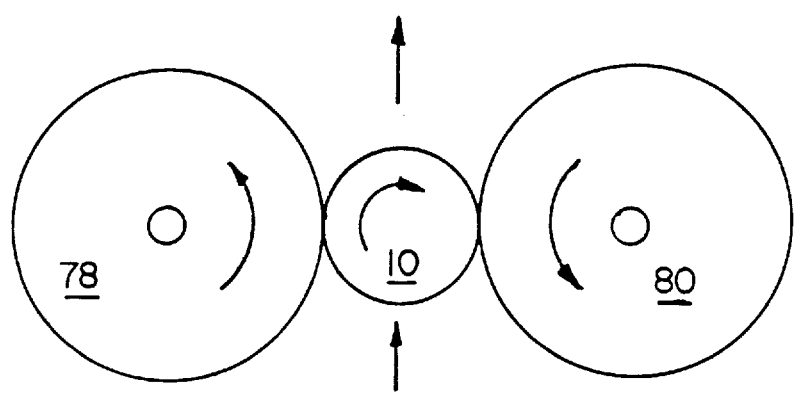
FIG. 8 is a schematic top plan view showing of the rollers of the wheels of the fine adjustment station of FIG. 6.

In the previously described embodiment, the seal disc 12 is adhered to the neck 14 during application of a downward force which urges the cap and seal disc within the cap against the lip 21. If desired, the seal disc may be adhered to the neck after the cap 10 is seated on the neck as is shown in FIGS. 6–8. Turning to FIG. 6, a container 8 having a cap 10 positioned on the neck 14 is transported to an axial application station 70 by a conveyor 72. Axial application station 70 applies a direct, axial force to move the cap 10 in a downward direction relative to the neck, causing the threads 35 on the cap to move past and then engage the threads 23 on the neck. In this embodiment of the invention, the axial application station includes a pressure belt 74 which is driven in a counter-clockwise direction by a motor (not shown). However, it is to be understood that axial application station 70 may include other means for moving the cap 21 downwardly onto the neck.

When the container 8 exits the application station 70, the cap 10 is substantially applied to the neck 14. However, at this stage the cap 10 is not always fully seated on the neck. Instead, the height of the cap on the neck may vary, introducing a gap between the underside of the cap top 32 and the lip 21 which may be as large as the vertical distance ΔT between adjacent threads. A fine adjustment station 76 is positioned downstream of the axial application station 70 for tightening the cap onto the neck. As is shown in FIGS. 6 and 7, the fine adjustment station 76 includes at least two spaced wheels 78 and 80 positioned to engage the exterior of the upper skirt 33 of the cap and slightly twist the cap relative to the neck. The position of the wheels is preferably adjustable horizontally relative to the center axis of the containers passing between the wheels to accommodate caps having different exterior diameters and wear of the wheels. The ability to adjust the wheel position ensures that the wheels 78 and 80 apply the force required to sufficiently tighten the cap onto the neck without over-torquing the cap on the neck. The vertical height of the wheels relative to the conveyor is also preferably adjustable to accommodate variations in the height of the cap and container. A pair of spaced guide rails 82 engage opposite sides of the exterior of the container and prevent the container 8 from turning on the conveyor 72 as the cap 10 is moved between the wheels 78 and 80.

With the closure system of this invention, the cap 10 is screwed onto the neck by rotating the cap in a clockwise direction relative to the neck. Turning to FIG. 8, as the container is moved by the conveyor 72 in the direction of the arrows, the cap 10 engages the wheels 78 and 80. In this embodiment, the wheels 78 and 80 are rotated in a counter-clockwise direction about their center axis by a motor (not shown). Wheel 78 is preferably rotated at a rate greater than the velocity of the belt 72 urge the cap 10 in a clockwise direction relative to the neck. Since contact with the wheel 80 exerts a force on the cap tending to rotate the cap in a clockwise direction, the rotational velocity of wheel 80 may be less than, equal to or greater than the velocity of the wheel 78. Alternatively, the wheel 80 may be idle or stationary. In the illustrated modification, the fine adjustment station 76 includes two pairs of wheels 78 and 80, although it is to be understood that the number of wheels may be increased or decreased in accordance with this invention. In addition, the wheels may be arranged in a staggered configuration. Instead of wheels 78 and 80, other means such as one or more belts may be used to engage the exterior of the upper skirt 33 and twist the cap 10 to tighten the cap on the neck 14.

The rotational velocity of the wheels 78 and 80 is selected to move the cap to the fully seated position, where y=0, without over torquing the cap on the neck. The maximum rotation of the cap relative to the neck which is required is typically the angular distance between adjacent leads of the thread configurations 23 and 35. For the cap and neck shown in FIGS. 1 and 2, where there are 7 leads, rotating the cap zero to 50 to 55 degrees will typically be sufficient to fully seat the cap on the neck so that the cap urges the seal disc 12 against the lip 21 of the neck.

After the cap 10 has been moved to the fully seated position, the conveyor 72 moves the container 8 to an adhesive activation station 84, where the adhesive is adhered to the neck by inducting heating or other means as is known in the art. Since the cap is in the fully seated position, the seal member 12 is securely held against the neck 14 during the critical bonding stage of the adhesive layer on the underside of the seal member.

In accordance with the present invention, the seal member is securely sealed to the container neck. In one modification of the invention, the cap is pressed against the neck by a pressure applicator 57 while the adhesive is activated. In another modification of the invention, axial force is applied to move the cap 10 in a downward direction onto the neck 14 to substantially apply the cap to the neck. The cap is then twisted slightly to move the cap into the fully seated position before the seal disc 12 is adhered to the neck. In other embodiments of the invention, the fine adjustment system 76 and pressure applicator 57 may both be employed to ensure the seal disc is uniformly held against the container neck by the cap 10 when the disc is adhered to the neck.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of sealing a container comprising the steps of:

positioning a closure on a neck of said container, said closure having a top, a closure skirt depending from said top and a seal disc disposed beneath said top, said neck having an opening, a lip surrounding said opening and a downward extending neck stretch below said lip, said closure skirt and said neck stretch being configured to interengage and retain said closure on said neck when said closure is applied to said neck;

moving said closure and said container below a pressure applicator having a profile which is directed downwardly from an inlet end of said pressure applicator to a lowermost level to apply pressure to at least one of said closure and said container to move said closure in a downward direction relative to said neck to bring said closure skirt and said neck stretch into interengagement, said closure being substantially applied to said container as said container and said closure pass below the lowermost level of said pressure applicator;

heating said seal disc to at least partially adhere said seal disc to said lip of said neck; and applying pressure with said pressure applicator to at least one of said closure and said container to hold said seal disc against said lip during said step of heating said seal disc.

2. The method of claim 1 in which said moving step includes positioning said container on a conveyor and moving said conveyor relative to said pressure applying member.

3. The method of claim 1 in which said moving step includes moving said container and said closure below a heating element during said step of moving said closure and said container below a pressure applicator to hold said seal disc against said neck, said heating element applying heat to said seal disc during said heating step.

4. The method of claim 3 in which said moving step includes moving said container and said closure below an inductive heating element.

5. The method of claim 1 in which said moving step includes moving said container and said closure below a pressure belt.

6. The method of claim 1 in which said step of moving said closure and said container below a pressure applicator includes pivoting said closure relative to said neck to press successive portions of said seal disc against said neck, and said heating step includes heating said seal disc to adhere the successive portions of said seal disc pressed against said neck to said lip.

7. The method of claim 1 in which said heating step includes inductively heating said seal disc.

8. The method of claim 1, and further comprising the step of twisting said closure relative to said neck before said step of heating said seal disc to tighten said closure onto said neck.

9. The method of claim 8 in which said twisting step includes rotating said closure no more than 55 degrees relative to said neck.

10. The method of claim 1, and further comprising the step of cooling said closure and said seal disc after said step of heating said seal disc.

11. The method of claim 1 in which said step of moving said closure and said container below a pressure applicator includes moving said closure and said container below a pressure applicator having a profile directed upwardly from the lowermost level to an outlet end of said pressure applicator.

12. A method of sealing a container comprising the steps of:

positioning a closure on a neck of said container, said closure having a top, a closure skirt depending from said top and a seal disc disposed beneath said top, said neck having an opening, a lip surrounding said opening and a downward extending neck stretch depending from said lip, said closure skirt and said neck stretch being configured to interengage and retain said closure on said neck when said closure is applied to said neck;

applying pressure to at least one of said closure and said container to move said closure in a downward direction relative to said neck to bring said closure skirt and said neck stretch into interengagement by pivoting said closure relative to said neck to press successive portions of said seal disc against said neck;

heating said seal disc to at least partially adhere said seal disc to said lip of said neck by adhering the successive portions of said seal disc pressed against said neck to said lip; and applying pressure to at least one of said closure and said container to hold said seal disc against said lip during said step of heating said seal disc.

13. The method of claim 12 in which said step of applying pressure to at least one of said closure and said container to hold said seal disc against said lip includes the step of moving said container and said closure below a pressure applying member with said pressure applying member pivoting said closure relative to said neck to press successive portions of said seal disc against said neck.

14. The method of claim 13 in which said moving step includes positioning said container on a conveyor and moving said conveyor relative to said pressure applying member.

15. The method of claim 13 in which said moving step includes moving said container and said closure below a heating element during said step of applying pressure to at least one of said closure and said container to hold said seal disc against said neck, said heating element applying heat to said seal disc during said heating step.

16. The method of claim 15 in which said moving step includes moving said container and said closure below an inductive heating element.

17. The method of claim 13 in which said moving step includes moving said container and said closure below a pressure belt.

18. The method of claim 12 in which said heating step includes inductively heating said seal disc.

19. The method of claim 12 and further comprising the step of twisting said closure relative to said neck before said step of heating said seal disc to tighten said closure onto said neck.

20. The method of claim 19 in which said twisting step includes rotating said closure no more than 55 degrees relative to said neck.

21. The method of claim 12, and further comprising the step of cooling said closure and said seal disc after said step of heating said seal disc.

* * * * *